United States Patent
Schwedt et al.

(10) Patent No.: US 12,146,832 B2
(45) Date of Patent: Nov. 19, 2024

(54) MICROSCOPE AND METHOD OF MICROSCOPY FOR PROVIDING ILLUMINATION LIGHT AND GENERATING AN ILLUMINATION PATTERN

(71) Applicant: Carl Zeiss Microscopy GmbH, Jena (DE)

(72) Inventors: Daniel Schwedt, Jena (DE); Tiemo Anhut, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 767 days.

(21) Appl. No.: 17/289,838

(22) PCT Filed: Oct. 23, 2019

(86) PCT No.: PCT/EP2019/078805
§ 371 (c)(1),
(2) Date: Apr. 29, 2021

(87) PCT Pub. No.: WO2020/088997
PCT Pub. Date: May 7, 2020

(65) Prior Publication Data
US 2021/0404964 A1 Dec. 30, 2021

(30) Foreign Application Priority Data
Oct. 31, 2018 (DE) .................... 10 2018 127 281.2

(51) Int. Cl.
*G02B 21/00* (2006.01)
*G01N 21/64* (2006.01)
(Continued)

(52) U.S. Cl.
CPC ..... *G01N 21/6458* (2013.01); *G02B 21/0032* (2013.01); *G02B 21/0044* (2013.01);
(Continued)

(58) Field of Classification Search
CPC ............ G02B 21/0032; G02B 21/0044; G02B 21/0048; G02B 21/0068; G02B 21/0076;
(Continued)

(56) References Cited

U.S. PATENT DOCUMENTS

| | | |
|---|---|---|
| 5,587,832 A | 12/1996 | Krause |
| 6,191,885 B1 | 2/2001 | Kitagawa |

(Continued)

FOREIGN PATENT DOCUMENTS

| | | |
|---|---|---|
| DE | 69720458 T2 | 2/2004 |
| DE | 102006047258 A1 | 4/2008 |

(Continued)

OTHER PUBLICATIONS

International Search Report dated Jun. 26, 2020 for DE 10 2018 127 281.2.

(Continued)

*Primary Examiner* — Arnel C Lavarias
(74) *Attorney, Agent, or Firm* — Duane Morris LLP (57) ABSTRACT

A microscope and method of microscopy having a light source for providing illumination light, a controllable manipulation device for generating in a variable manner an illumination pattern of the illumination light to be selected, an illumination beam path with a microscope lens for guiding the illumination pattern to a sample to be examined, a detector having a plurality of pixels for examining the fluorescent light emitted by the sample, a detection beam path for guiding the fluorescent light emitted by the sample to the detector, a main beam splitter for splitting illumination light and fluorescent light, a control and evaluation unit for controlling the manipulation device and for evaluating the data measured by the detector. The manipulation device is arranged in the illumination beam path upstream from the main beam splitter such that the pixel of the detector can be (Continued)

individually activated using the control and evaluation unit and in read out patterns to be selected.

52 Claims, 5 Drawing Sheets (51) Int. Cl.
  *G02B 21/02* (2006.01)
  *G02B 26/08* (2006.01)
  *G02B 27/09* (2006.01)
  *G02B 27/28* (2006.01)

(52) U.S. Cl.
  CPC ..... *G02B 21/0048* (2013.01); *G02B 21/0068* (2013.01); *G02B 21/0076* (2013.01); *G02B 21/008* (2013.01); *G02B 21/025* (2013.01); *G02B 26/0833* (2013.01); *G02B 27/0944* (2013.01); *G02B 27/283* (2013.01)

(58) Field of Classification Search
  CPC ................ G02B 21/008; G02B 21/025; G02B 26/0833; G02B 27/0944; G02B 27/283; G02B 21/00; G02B 21/0004; G02B 21/002; G02B 21/0024; G02B 21/0036; G02B 21/004; G02B 21/0052; G02B 21/006; G02B 21/0072; G02B 21/0084; G02B 21/06; G02B 21/361; G02B 21/36; G02B 21/365; G01N 21/6458; G01N 21/6456; G01N 2021/6463; G01N 21/6486
  USPC ....... 359/368, 362, 363, 369, 385, 386, 388, 359/389, 390, 434
  See application file for complete search history.

(56) References Cited

U.S. PATENT DOCUMENTS

| | | | |
|---|---|---|---|
| 6,456,359 | B1 | 9/2002 | Nishikawa et al. |
| 9,456,746 | B2 | 10/2016 | Bublitz et al. |
| 2006/0140462 | A1 | 6/2006 | Saggau et al. |
| 2018/0164562 | A1 | 6/2018 | Byeon et al. |
| 2022/0206275 | A1* | 6/2022 | Anhut ................ G02B 21/0036 |

FOREIGN PATENT DOCUMENTS

| | | | |
|---|---|---|---|
| DE | 102013018672 A1 | | 5/2015 |
| DE | 102015112960 B3 | | 10/2016 |
| DE | 102015116598 A1 | | 3/2017 |
| EP | 2317362 A1 | | 5/2011 |
| JP | 2000193889 A | | 7/2000 |
| JP | 2019532360 A | * | 11/2019 |

OTHER PUBLICATIONS

Translation of Written Opinion of International Searching Authority dated Jun. 26, 2020 for DE 10 2018 127 281.2.

German Search Report dated Apr. 4, 2019 for DE 10 2018 127 281.2.

Translation of International Preliminary Report on Patentability dated Apr. 27, 2021 for PCT/EP2019/078805.

Siwei Li, et al., Rapid 3D image scanning microscopy with multi-spot excitation and double-helix point spread function detection, Optics Express (Sep. 3, 2018) vol. 26, No. 18, p. 23585-23593.

Office Action issued Jan. 19, 2023 in counterpart CN Application No. 201980071523.6 .

* cited by examiner

MICROSCOPE AND METHOD OF MICROSCOPY FOR PROVIDING ILLUMINATION LIGHT AND GENERATING AN ILLUMINATION PATTERN

RELATED APPLICATIONS

The present application is a U.S. National Stage application of International PCT Application No. PCT/EP2019/078805 filed on Oct. 23, 2019 which claims priority benefit of German Application No. DE 10 2018 127 281.2 filed on Oct. 31, 2018, the contents of each are incorporated by reference in their entirety.

FIELD OF THE INVENTION

In a first aspect, the present invention relates to a microscope, and in a second aspect to a method of microscopy, both in accordance with the preambles of the annexed independent claims.

BACKGROUND OF THE INVENTION

A microscope of the generic type comprises the following components: a light source for providing illumination light, a controllable manipulation device for variably generating an illumination pattern to be selected of the illumination light, an illumination beam path with a microscope objective for directing the illumination pattern onto a sample to be examined, a detector having a multiplicity of pixels for detecting fluorescent light emitted by the sample, a detection beam path for directing the fluorescent light emitted by the sample onto the detector, a main beam splitter for splitting illumination light and fluorescent light, and a control and evaluation unit for controlling the manipulation device and for evaluating the data measured by the detector.

In a method for microscopy of the generic type, the following steps are carried out: Illumination light is provided by a light source, an illumination pattern is generated by a controllable manipulation device for variably generating an illumination pattern to be selected of the illumination light, the illumination pattern is directed via an illumination beam path with a microscope objective onto a sample to be examined, fluorescent light emitted by the sample is directed via a detection beam path onto a detector having a multiplicity of pixels, wherein illumination light and fluorescent light are split by a main beam splitter, and the fluorescent light is finally detected by the detector.

In biomedical research, interest in living cell imaging is steadily growing. This gives rise to stringent requirements made of the imaging systems used, and in particular of the microscopes. On the one hand, high image refresh rates are required in order to follow the dynamic processes in the sample. On the other hand, the observation should have as little influence as possible on the development and behavior of the sample. It is thus necessary to minimize the incident light dose and the incident energy densities, that is to say the laser power used for a given focus size, since light has a toxic effect on cells and thus shortens their lifetime. In principle, both conditions are met very well by wide-field microscopes. What is problematic here, however, is that increasingly the living cells are to be understood as an ensemble and their interaction among one another is therefore to be examined. Consequently, the samples are no longer two-dimensional, but rather have a finite thickness. During an observation using a wide-field microscope, that results in the desired signal being superimposed with out-of-focus light that is imaged unsharply onto the sensor. Accordingly, the information sought is sometimes not detectable or detectable only with poor contrast. A technology that allows optical sectioning—that is to say the measurement of individual sample planes with the signals of all other planes being suppressed or discriminated—without destroying the sample is accordingly indispensable.

The confocal laser scanning microscope (LSM) has become established as a standard for detecting optical sections; it is very effective at blocking out-of-focus light at the confocal pinhole and discriminating the light prior to detection. However, the LSM is very slow owing to the scanning building up the image sequentially. Moreover, relatively high light intensities, that is to say quantities of energy, are input into the sample in order still to achieve an acceptable signal-to-noise ratio given the inherent short pixel times. Accordingly, the LSM is not ideally suitable for imaging in the case of living cells.

With the development of DLP technology (DLP=Digital Light Processing), so-called programmable array microscopes (PAM) have been discussed in the literature. In that case, a DMD array is positioned in an intermediate image plane of the microscope and illuminated with the excitation light. Illumination patterns are then activated by means of the DMD in order to illuminate the sample simultaneously at a plurality of positions. The fluorescence excited in the sample is then directed via the same DMD array again and passed on for detection on a matrix sensor, generally an sCMOS. The DMD array thus serves simultaneously as both excitation and detection pinhole matrix. The excitation patterns of the DMD array are then systematically switched through until complete scanning of the sample plane has been achieved.

On account of the parallelization achievable by way of the PAM being of virtually any desired magnitude, frame rates limited only by the image recording rate of the camera are possible. The pixel residence time is nevertheless increased in comparison with the LSM, and so the average laser power per sample position can be significantly reduced. It is then still possible to vary the degree of parallelization depending on the sample thickness in order to increase the contrast with out-of-focus light. This is detrimental to frame rate or pixel residence time.

What is disadvantageous about the PAM, however, is firstly the detection efficiency, since the emission must necessarily be guided via the DMD array, which generally consists of silicon mirrors coated with aluminum. Losses of almost 20% are already incurred by the signal due to aluminum. In addition, such a mirror matrix is a regular two-dimensional grid, at the substructure of which the emission light is diffracted, as a result of which additional signal losses are caused by diffraction into higher orders. Furthermore, the use of a DMD matrix in the intermediate image of the microscope means that the DMD structure is imaged directly onto the camera, thus giving rise to pattern artefacts. In addition, the geometric dimensioning can be problematic. Commercially available mirror matrices currently have a maximum number of 1080 rows of micromirrors. That limits the applicability of the PAM to optical sectioning with respect to the image field size and objective selection. In the case of very large image fields, many objectives cannot be assisted to effect confocal scanning. For these reasons, the PAM has been unable to gain commercial acceptance hitherto.

One device that is often used for living cell imaging is the spinning disc microscope (SDM). Here two disks positioned fixedly with respect to one another are rotated at a high rotational speed. A matrix of microlenses is arranged on the disk facing the laser. Each microlens is assigned a pinhole on the downstream disk. The microlens disk is illuminated over a large area by means of the excitation laser, which is thereupon focused through the pinholes. A dichroic beam splitter is arranged between the two disks and transmits the laser light and reflects fluorescent light. The pinhole disk is imaged into the sample by means of downstream optics. On account of the rotation of the disk, the sample is scanned in an extremely parallelized manner (approximately 1000×) by an array of excitation spots. The fluorescence generated in the excitation spots is imaged onto the pinhole disk and confocally filtered there. At the downstream beam splitter, the fluorescence is deflected to the camera.

The great advantage of the SDM is the extremely parallelized confocal detection, which thus has a relatively gentle effect on the sample. Since cameras have to be used as sensors, however, the SDM is purely an observation device with confocal image quality. The confocal resolution limit cannot be attained straightforwardly since the pinholes have to be of a finite size. In addition, the pinhole size is only ever approximately appropriate for a specific objective. Consequently, other objectives cannot be optimally used from the outset because either they generate a smaller point spread function at the pinhole, which results in a lengthened detection point spread function, or else they overexpose the pinhole, which can result in great losses of efficiency. Improving the resolution over and above the possibilities of an SDM necessitates stroboscopic illumination that is phase-shifted relative to the rotation of the disks. In addition, only a single image can be recorded per illumination shot, and so the frame rate for high-resolution imaging is extremely low and thus of no interest for living cell imaging. Experiments away from image acquisition cannot be established since only full frames can be read out. Furthermore, these systems are not very flexible with regard to the setting of the observed region, which has the effect that when a small structure is observed, significantly larger regions have to be concomitantly exposed.

SUMMARY OF THE INVENTION

An object of the present invention can be considered that of specifying a microscope and a method for microscopy which enable extremely parallelized scanning of a living sample with confocal limiting resolution and furthermore, away from pure imaging, further experimentation techniques on the living sample.

This object is achieved by means of the microscope having the features of the annexed independent microscope claims, and by means of the method for microscopy having the features of the annexed independent method claims. Preferred configurations of the microscope according to the invention and advantageous variants of the method according to the invention are described below, in particular in association with the annexed dependent claims and the figures.

The microscope of the type specified above is developed according to the invention by the fact that the manipulation device is arranged in the illumination beam path upstream of the main beam splitter in the vicinity of a plane that is optically conjugate with respect to a sample plane, that the pixels of the detector are activatable by the control and evaluation unit individually and in read-out patterns to be selected, and that the control and evaluation unit is configured for activating pixels of the detector individually or in a selected read-out pattern depending on a selected illumination pattern.

The method of the type specified above is developed according to the invention by the fact that the manipulation device is arranged upstream of the main beam splitter in the vicinity of a plane that is optically conjugate with respect to a sample plane, and that the pixels of the detector are activated individually or in a selected read-out pattern depending on a selected illumination pattern.

Particularly preferably, the manipulation device is arranged in a plane that is optically conjugate with respect to a sample plane. It goes without saying that this indication should not be understood in a mathematical sense, but rather within the scope of typical positioning inaccuracies.

What can be deemed to be a basic concept of the present invention is that, in a departure from previous solutions, the detection light is not guided again via the manipulation device by which the illumination pattern is formed.

The invention provides a particularly versatile microscope and a particular versatile method for microscopy.

An illumination pattern is understood to mean the actual pattern of the illumination on the illuminated surface of the sample, for example a point pattern, a line pattern, gridlike illumination or illumination tailored specifically to a biological sample. When a pixelated manipulation device is used, in this case a specific illumination pattern naturally corresponds to a specific combination of activated pixels of the manipulation device.

The term read-out pattern is understood to mean fundamentally any desired combination of pixels to be activated of the detector.

Lasers are expediently used as light sources. However, further intensive light sources, such as e.g. LEDs, can also be used. In a manner known per se, computing devices, in particular PCs, are used as control and evaluation unit.

The apparatus according to the invention is suitable in particular for carrying out the method according to the invention.

In particularly preferred embodiments of the microscope according to the invention, the manipulation device for generating an illumination pattern to be selected comprises a multiplicity of pixels and, in particular, a spatial light modulator (SLM), such as a digital micromirror array (DMD), for example. Such components are obtainable with resolutions of 4096×2160 pixels, for example. The major advantage of such pixelated manipulation devices can be seen in the fact that owing to the free controllability, the possibilities of the illumination patterns are limited in principle only by the spatial resolution and the rapidity of the component used.

In a further configuration of the microscope according to the invention, the manipulation device for variably generating an illumination pattern comprises a movable, in particular rotatable, stop disk. As a result of movement, in particular as a result of rotation, of said stop disk, the sample is illuminated with variable illumination patterns.

In order to achieve confocality at least in part, the stop openings of the stop disk have to be limited to the dimension of a confocal stop at least in one spatial dimension. By way of example, in a manner known in principle, the stop disk can comprise a multiplicity of pinhole stops arranged spirally, in particular in the form of Archimedes' spirals, and can be a Nipkov disk, in particular. Stop disks having a multiplicity of slots are likewise possible.

In order at least partly to remedy the problem of the great loss of illumination light at the stop disk, advantageously a microlens array can be present upstream of the rotatable stop disk, which microlens array focuses illumination light onto the stop openings of the stop disk and rotates at the same speed as the stop disk during operation. The microlenses are expediently dimensioned such that they focus the illumination light onto the stop openings.

In the configurations having a movable stop disk, the control and evaluation unit is expediently configured to synchronize a read-out pattern of the detector with an illumination pattern generated by the moving, in particular rotating, stop disk.

In variants with a rotating stop disk, a further advantageous configuration of the microscope according to the invention consists in the fact that a photodiode for measuring an intermittent light transmission through the rotatable stop disk or for measuring an intermittent light reflection from the rotatable stop disk is present for synchronizing control of the detector with a movement of the rotatable stop disk. The transmission or reflection signal provides a reliable triggering signal for the control of the detector.

In principle, for the microscope according to the invention it is possible to use any type of pixelated detector by which the light to be detected is detected sufficiently sensitively and which can be read sufficiently rapidly. In particularly preferred variants of the microscope according to the invention, the detector comprises a Single Photon Avalanche Diode ("SPAD") array or a SPAD camera. A highly sensitive photon counting measurement is possible with these sensors, which can be fabricated in CMOS processes.

In order to increase the fill factor, that is to say the ratio of the light-sensitive area to the total pixel area, a microlens array can advantageously be present upstream of the detector. This measure is expedient in particular if the pixel rasters of the manipulation device and of the detector do not match.

The light radiated back from a sample contains, in a manner known per se, reflected and backscattered spectral components of the illumination light, which can also be referred to as excitation light, and fluorescence components that are red-shifted in comparison therewith. The main color splitter serves to split the spectral components of the illumination light from the fluorescence components. A further segregation of undesired spectral components in the detection beam path can be realized if at least one emission filter, in particular a changer having a plurality of emission filters, is present in the detection beam path downstream of the main color splitter. The changer can be a filter wheel for example.

Preferred variants of the microscope according to the invention relate to the assignment of pixels of the manipulation device to pixels of the detector. Strictly speaking, the manipulation device as such is not imaged optically onto the detector, since the illumination light is split on the return path from the sample at the main color splitter. The numbers of pixels in the manipulation device, that is to say in particular in the DMD, and in the detector, that is to say in particular in the SPAD array, are generally not identical.

By way of example, a specific group of pixels of the manipulation device can be imaged onto a defined group of pixels of the detector. In particular, each pixel of the manipulation device can be imaged onto a defined group of pixels of the detector. Likewise, a specific group of pixels of the manipulation device can be imaged onto a specific pixel of the detector.

By way of example, the pixels can be assigned in specific numerical ratios. In this regard, for example, a group of 2×2 or 4×4 pixels of the DMD can be assigned to one pixel of the detector.

In one special case, each pixel of the manipulation device is imaged onto exactly one pixel of the detector. This situation is also referred to as pixel-accurate imaging. This means that a sample region illuminated by a specific pixel of the manipulation device is imaged onto in each case exactly one pixel of the detector.

The signals of the individual pixels can also be assigned after the measurement recording if the entire SPAD matrix is read. If necessary, a microlens array upstream of the SPAD camera provides for fill factor optimization. Furthermore, if necessary, an optical zoom between main color splitter and detector or between the manipulation device and main color splitter can ensure the corresponding assignment or adapt the arrangement to the measurement task.

In one particularly preferred configuration of the microscope according to the invention, the control and evaluation unit is configured to control the detector with a read-out pattern corresponding to the selected illumination pattern. From a method standpoint, the detector can advantageously be controlled with a read-out pattern corresponding to the illumination pattern generated by the manipulation device.

In this case, a read-out pattern is understood to mean a specific combination of activated pixels of the detector. In the case of pixel-accurate imaging, that means that a specific pixel of the detector is activated precisely when illumination light is radiated onto the sample by that pixel of the manipulation device which is associated by way of the pixel-accurate imaging. If pixel-accurate imaging is not present, the control of the detector with a read-out pattern corresponding to the selected illumination pattern means that the illumination pattern and the read-out pattern are similar insofar as they are able to be converted into one another by scaling, that is to say linear transformation.

In the case of pure fluorescence microscopy, the control and evaluation unit is expediently configured to control the detector synchronously with the read-out pattern corresponding to the illumination pattern. In this case synchronously means, in particular, that the respective pixels of the detector are activated within the fluorescence lifetime of the dyes. However, it is also possible for the control and evaluation unit to be configured to control the detector with a read-out pattern in a manner temporally offset, in particular variably temporally offset, with respect to an illumination pattern radiated onto the sample. In a corresponding advantageous variant of the method according to the invention, the detector is controlled with a read-out pattern in a manner temporally offset with respect to an illumination pattern radiated onto the sample. This can be advantageous for example for examining phosphorescence processes or other processes, in particular in biological samples, which proceed much more slowly in comparison with the fluorescence lifetime of the dyes.

In principle, there is great freedom in the concrete design of the illumination patterns. In advantageous variants of the microscope according to the invention, the control and evaluation unit is configured to control the manipulation device for scanning illumination patterns, in particular point patterns, line patterns or gridlike patterns, over the sample.

In principle, the dimensioning of the detection beam path stipulates whether confocal microscopy is made possible with suitable control of the detector. By way of example, the detection beam path can be dimensioned such that a detection point spread function on the detector illuminates more than one pixel, in particular more than 5 pixels. Given such an arrangement, confocal measurements and an oversampling of the point spread function are accordingly possible.

Greater freedom is obtained in this context if a zoom optical unit is present between the main beam splitter and the microscope objective in order to vary the size of the illumination field on the sample. An imaging scale with which the manipulation means is imaged onto the sample can be varied by means of the zoom optical unit.

Moreover, a zoom optical unit can be present between the manipulation device and the main beam splitter and/or between the main beam splitter and the detector. As a result, an assignment of the pixels of the manipulation device to the pixels of the detector can be varied as required.

By way of example, a setting of the zoom optical unit can be chosen for which the manipulation device, in particular a DMD matrix, is imaged onto a full field of view. For example, the optical unit can be dimensioned such that a partial mirror, that is to say a pixel of the manipulation device, then corresponds to an illumination spot having a diameter of 1 to 2 AU (AU=Airy Unit). The imaging onto the detector matrix is then not diffraction-limited and is, rather, suitable for rapidly recording overview images.

However, the invention also enables advantageous variants in which a setting of the zoom optical unit is chosen for which the manipulation device, in particular a DMD matrix, is imaged only onto a part of a field of view. A confocal detection or oversampling of the point spread function can be achieved in these variants.

The possibilities for spatial manipulation of the illumination field can also be extended if, as an alternative or in addition to the zoom optical unit, a scanning unit, in particular having galvanometric scanner mirrors, is present for laterally displacing the illumination field. In a manner that is known in principle, such a scanning unit is expediently positioned in a plane that is optically conjugate with respect to the back pupil of the microscope objective. The illumination field can advantageously be displaced laterally, for example in x- and y-directions, by means of a scanning unit.

In principle, with suitable control of the manipulation device, scans with point, line or grid illumination can be carried out by means of the scanning unit. However, it is also possible for the manipulation device itself to carry out such scans. If a scanning unit is present, it is possible, by means of the scanning unit, to displace the illumination field in a raster of partial images by at least one raster position therein and it is then possible to carry out a scan again by means of suitable control of the manipulation device.

Expediently, a polarizing beam splitter (PBS) and a quarter-wave plate can be present for conditioning the illumination light in the illumination beam path upstream of the main beam splitter. Instead of the combination of PBS and quarter-wave plate, it is also possible for a Total Internal Reflection (TIR) prism to be used in the illumination beam path, as customary in projection applications. A TIR prism has the advantage that suppressed light can be geometrically split from the used light.

For suitably conditioning the spectral composition of the illumination light, it may be advantageous if at least one excitation filter, in particular a changer having various excitation filters, is present in the illumination beam path upstream of the main color splitter. In a manner known in principle, the changer can be in particular a filter wheel or a linearly displaceable changer.

For suitably conditioning, for example for homogenizing, the spatial intensity profile of the illumination light, it may be advantageous if a diffractive optical element is present in the illumination beam path, in particular directly downstream of the light source. By way of example, an initially substantially Gaussian spatial intensity profile can thus be converted into a spatial intensity profile substantially having a rectangular shape.

Even more possibilities for manipulation with regard to the spectral composition and the spectral spatial intensity distribution of the illumination light can be achieved if a further light-shaping unit, in particular a spatial light modulator (SLM), is present upstream of the manipulation device. By way of example, such a further light-shaping unit can serve to concentrate specific spectral components of the excitation light onto specific regions of the manipulation device. Supplementarily or alternatively, for such purposes, upstream of the further light-shaping unit at least one color splitter can also be present for directing selected wavelengths to the further light-shaping unit.

In this context, moreover, at least one separate light source, in particular a further laser, can advantageously be present for optically manipulating the sample. Such a further laser preferably provides light of particular wavelengths that are suitable for the optical manipulation of a sample. The sample is thus illuminated polychromatically in such method variants.

The laser or lasers, in particular for time-resolving measurements, is or are preferably operated in a pulsed manner, in particular with pulse durations in the picoseconds range.

In a manner known per se, furthermore, a means for wavefront modulation, in particular a spatial light modulator (SLM), can be present in the illumination beam path, in particular in a plane that is optically conjugate with respect to the back pupil of the microscope objective. For this purpose, if necessary, a relay optical unit can be present in the illumination beam path in order to provide an additional pupil plane. An adaptive correction of the illumination field is thereby provided in order to guarantee the best possible excitation point spread function for relatively thick samples.

In one preferred variant of the method according to the invention, the detector comprises a photon counting sensor, in particular a SPAD camera, the pixels of which are operated in the Geiger mode, and digital counts corresponding to photon detection events are read out by the detector. In each case individual photons are thus counted with the pixels of the detector. That means that fluorescence measurements can be carried out with very low intensities of the excitation light and damage to an, in particular living biological, sample can thus be avoided as well as possible. By way of example, the FLIM signal of the dyes can be detected with the use of a laser that is pulsed in the picoseconds range. In comparison with the very short integration or read-out time of the SPAD camera, the movement of the pixels of a DMD or the switchover between different illumination patterns is much slower, that is to say a quasi-static process.

In particularly advantageous variants of the method according to the invention, exposure times for individual pixels of the detector are set specifically. By way of example, the exposure times for individual pixels of the detector can be set specifically, that is to say separately and individually for each pixel, depending on measurement data obtained from the sample. As a result, for example, a longer exposure time can be employed for regions of the sample which emit comparatively weakly, and a shorter exposure time can be employed for other regions of the sample that emit relatively intensely.

As a result, variants of the method according to the invention which have a particularly gentle effect on the sample also become possible in which at least one region of a sample is no longer impinged on by illumination light as soon as a specific value for a signal-to-noise ratio has been reached in these regions in a recorded image. The limit or threshold value for the signal-to-noise ratio can advantageously be set by a user as needed, in principle also differently for different regions.

In preferred configurations of the method according to the invention, temporally resolved measurements are carried out after an optical excitation and/or manipulation of the sample.

By way of example, in the case of FLIM (FLIM=Fluorescence-Lifetime Imaging Microscopy), fluorescence lifetimes of the emissive dyes can be determined by evaluating detection times of individual photons.

With regard to the control pattern with which the detector is controlled, a further advantageous variant of the method according to the invention consists in the fact that a movement carried out by a component of an, in particular biological, sample is extrapolated. For this purpose, methods of artificial intelligence, pattern recognition and machine learning can be used in the control and evaluation unit.

The structuring of a pixelated manipulation device, in particular of a DMD, can cause artefacts in the image measured by the camera. These artefacts can be reduced if the scanning unit is actuated slightly during an integration time of the detector.

That means that the artefacts caused by the structure of the DMD are blurred on the detector. By way of example, the illumination field, between individual images to be summed, can be moved laterally by the scanning unit by a fraction of an Airy disk, in particular by 1% to 50%, preferably 3% to 30% and particularly preferably 5% to 15% of an Airy disk. The artefacts caused by the structure of a DMD are reduced particularly effectively if the illumination field, between individual images to be summed, is moved in two independent coordinate directions (x, y).

The term integration time can denote in particular that time over which the signals of the pixels or pixel groups or all pixels of the sensor are integrated, that is to say digitally summed.

With SPAD cameras, a photon flux can in principle be measured continuously, i.e. without being clocked. On the other hand, clocked or synchronized operation, as in a conventional camera, is likewise possible for a SPAD camera. One particular advantage of SPAD cameras, however, is that different integration times can be applied in different regions of the image. In principle, it is possible for the incoming pulses to be summed locally in each case, that is to say to be integrated "digitally" for different periods of time. That is one of the major advantages of SPAD technology.

In one preferred variant of the method according to the invention, integration will be effected for different periods of time in different image regions by means of the manipulation device and the SPAD camera together, which reduces the light input to a minimum and in the process measures it optimally depending on the sample.

In principle, the apparatus according to the invention enables a particularly large number of method variants. By way of example, methods of Structured Illumination Microscopy (SIM) illumination of the sample that are known in principle can be carried out. Photoactivated Localization Microscopy (PALM), Direct Stochastic Optical Reconstruction Microscopy (d-STORM), Super-resolution Optical Fluctuation Imaging (SOFI) or Fluorescence Recovery After Photobleaching (FRAP) methods are additionally possible.

BRIEF DESCRIPTION OF THE DRAWINGS

Further advantages and features of the microscope according to the invention and of the method according to the invention are explained below in association with the figures. In the figures.

DETAILED DESCRIPTION OF THE DRAWINGS

Identical and identically acting components are generally identified by the same reference signs in the figures.

Figure 1:
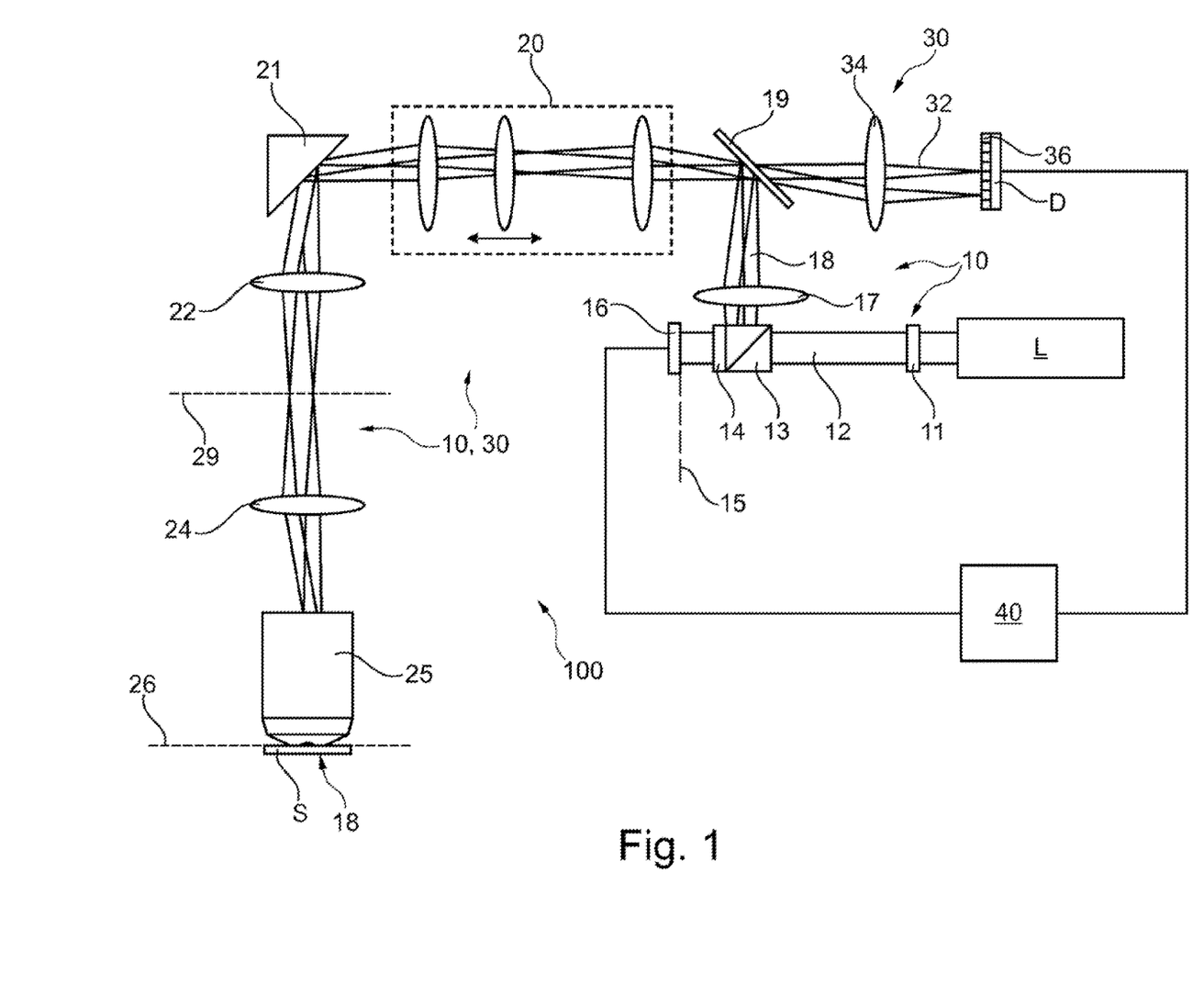
FIG. 1: shows a first exemplary embodiment of a microscope according to the invention.

The first exemplary embodiment of a microscope 100 according to the invention as shown in FIG. 1 comprises as essential components firstly a light source L for providing illumination light 12, a controllable manipulation device 16 for variably generating an illumination pattern 18 to be selected of the illumination light 12, an illumination beam path 10 with a microscope objective 25 for directing the illumination pattern 18 onto a sample S to be examined, a detector D having a multiplicity of pixels 36 for detecting fluorescent light 32 emitted by the sample S, a detection beam path 30 for directing the fluorescent light 32 emitted by the sample S onto the detector D, a main beam splitter 19 for splitting illumination light 12 and fluorescent light 32, and a control and evaluation unit 40 for controlling the manipulation device 16 and for evaluating the data measured by the detector D.

In the exemplary embodiment shown, the light source L is a laser, which can also be referred to as an excitation laser. In the example in FIG. 1, a digital micromirror array, referred to hereinafter as DMD matrix or just as DMD (Digital Micromirror Device) is used as manipulation device 16. The control and evaluation unit 40 can be a computing device whose nature is known in principle. A PC is typically used. In the exemplary embodiment shown, the detector D is a SPAD camera.

According to the invention, the DMD is arranged in the illumination beam path 10 upstream of the main beam splitter 19, that is to say in that part of the illumination beam path 10 which is exclusively illumination beam path and not detection beam path, specifically in a plane 15 that is optically conjugate with respect to a sample plane 26. That means that the illumination beam path 10 images the surface of the DMD matrix 16 onto the sample. According to the invention the PC 40 is configured to activate the pixels 36 of the detector D individually and in readout patterns to be selected depending on a selected illumination pattern 18.

The DMD matrix 16 in the illumination beam path 10 is illuminated by the excitation laser L. The wavelength of the laser L can be settable or selectable from a multiplicity of wavelengths. The intensity of the laser L can be settable for example by means of an acousto-optical element (AOM, AOTF), not illustrated in FIG. 1. In the exemplary embodiment shown in FIG. 1, a diffractive optical element (DOE=Diffractive Optical Element) 11 is arranged directly downstream of the laser L and ensures a uniform light distribution, that is to say a spatial intensity profile substantially having a rectangular shape. A polarizing beam splitter (PBS=Polarizing Beam Splitter) 13 and a quarter-wave plate 14 are arranged upstream of the DMD matrix 16, such that light arriving from the laser L and polarized linearly can propagate to the DMD matrix 16. Illumination light 12 reflected at the DMD matrix 16 experiences a polarization rotation by 90° owing to its passing through the quarter-wave plate 14 twice and is reflected at the polarizing beam splitter 13 and passes via a lens 17 to the main beam splitter 19. The illumination light 12 downstream of the DMD matrix 16 has the respectively selected illumination pattern 18.

Instead of the combination of polarizing beam splitter (PBS=Polarizing Beam Splitter) 13 and quarter-wave plate 14, a TIR prism can also be used, as customary in projection applications. The latter solution has the advantage that suppressed light can be geometrically split from the used light.

Downstream of the main beam splitter 19, in the exemplary embodiment shown in FIG. 1, the illumination light 12 passes through a zoom optical unit 20 and, after reflection at a deflection mirror 21, passes via a lens 22 and a tube lens 24 to the microscope objective 25 and is focused by the latter onto the sample S into the sample plane 26. An intermediate image plane 29, that is to say a plane that is optically conjugate with respect to the sample plane 26, is situated between the lens 22 and the tube lens 24. The zoom optical unit 20 enables a scaling of the imaging scale from the DMD matrix 16 into an intermediate image into the intermediate image plane 29 of the illumination beam path 10. The illumination beam path 10 overall images the illumination pattern 18 from the DMD matrix 16 into the focal plane 26 of the microscope objective 25. Fluorescent light 32 emitted by the sample S is captured by the microscope objective 25 and passes via the same beam path, which in this direction is referred to as detection beam path 30, back as far as the main beam splitter 19. At the main beam splitter 19, the fluorescent light 32 is transmitted and is imaged by the lens 34 onto the pixels 36 of the SPAD camera D. The DMD matrix 16 can advantageously be imaged onto the SPAD camera approximately pixel-accurately or pixel-faithfully. However, that is not a strict requirement because the numbers of pixels in the DMD matrix 16 and the SPAD camera D can deviate from one another. It is also possible to assign the measurement signals of the individual pixels 36 of the SPAD camera D only after the measurement recording if all pixels 36 of the SPAD camera D are read. A microlens array for optimizing the fill factor can advantageously be present upstream of the SPAD camera D. The activation patterns of the DMD matrix 16, that is to say the illumination pattern 18, and of the SPAD camera D, that is to say the read-out pattern, are coordinated with one another and can preferably be switched over synchronously. In this case, the synchronization can be realized by the control and evaluation unit 40.

The DMD matrix 16 is optically conjugate with respect to the sample plane 26, on the one hand, and with respect to the detection plane of the SPAD camera D, on the other hand, but is arranged in the pure illumination beam path 10, which can also be referred to as excitation beam path. The SPAD camera D serves both as sensor and as switchable pinhole matrix, such that confocality can be achieved by means of targeted activation of the sensor pixels 36 and given corresponding dimensioning of the imaging.

If the zoom optical unit 20 is set such that the full field of view can be addressed by the DMD matrix 16, a partial mirror of the DMD matrix 16, depending on the objective used, corresponds to an illumination spot having a diameter of 1 to 2 AU (1 AU=1 Airy Unit). In this situation the imaging is thus not diffraction-limited and is, rather, suitable for recording rapid overview images.

If the zoom optical unit is set such that only a part, for example half, of the full field of view is illuminated by the DMD matrix 16, confocal detection or oversampling of the detection point spread function becomes possible. For this purpose, for example, a detection point spread function can correspond, in terms of size, to a diameter of 3 pixels and can thus be sampled at 7 locations. If assuming relations such as are customary for example in SDM (SDM=Spinning Disk Microscopy), there are approximately 5 AU and thus approximately 15 pixels between the maxima of the individual detection point spread functions. With a sensor matrix having 512×512 pixels, approximately 900 detection point spread functions could thus be recorded simultaneously and in each case in an oversampled manner. This example serves merely to illustrate the possibilities. Other combinations of parameters are possible, of course, within the scope of the present invention.

The arrangement from FIG. 1 is very flexible with regard to the switchable illumination patterns 18. Many further application possibilities result therefrom. Besides the traditional, regular illumination patterns 18, for example randomly chosen patterns can also be applied. Line profiles can be defined and scanned over the sample S by sequential switching of the illumination patterns 18. Gridlike illumination patterns 18 are additionally possible, which yield confocal image data with corresponding computation. Moreover, the system can learn from the measured data in principle where a sample S emits intensely, weakly or not at all, and can correspondingly adapt the exposure duration in these regions, that is to say in principle individually for each pixel 36 of the SPAD camera.

Since oversampling of the detection point spread function is possible in principle with the SPAD camera D, it is also possible to simultaneously measure fluorescent light from a plurality of planes of the sample S, either by use of the method of wavefront coding for so-called "extended depth of field" imaging. By way of example, for this purpose, a cubic phase mask, for instance an SLM, can be positioned in the illumination beam path 10 and/or in the detection beam path 30. However, this yields in principle only a projection over a specific z-region of a sample S.

Furthermore, it is also possible to perform a genuine coding of different sample planes, that is to say planes of the sample S having different z-coordinates, in such a way that they are separable. For this purpose, by way of example, in the illumination beam path 10 and/or in the detection beam path 30, a helical point spread function or else in principle any other suitable point spread function can be generated and the signal can be correspondingly evaluated.

Figure 2:
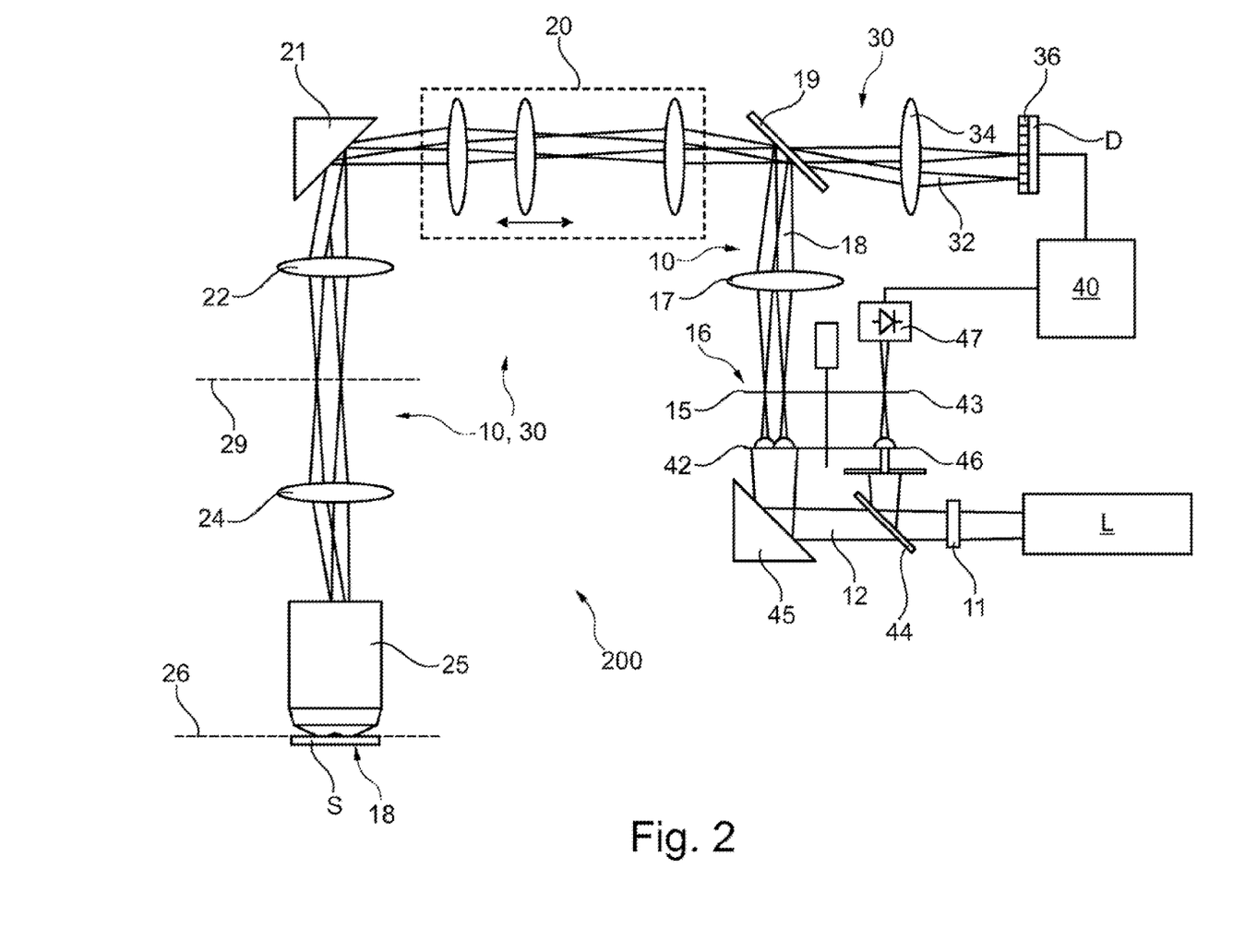
FIG. 2: shows a second exemplary embodiment of a microscope according to the invention.

The exemplary embodiment of a microscope 200 according to the invention as illustrated in FIG. 2 differs from the microscope 100 from FIG. 1 merely in the region of the pure illumination beam path 10, that is to say in the region of the illumination beam path 10 upstream of the main beam splitter 19. In the case of the microscope in FIG. 200, the polarizing beam splitter 13 with the quarter-wave plate 14 and the DMD array 16 are replaced by two disks 42, 43 that rotate during operation of the microscope. The disk 42 facing the laser L in the illumination beam path 10 carries a matrix of microlenses, which focuses the laser light through pinholes associated to the respective microlenses on the rotatable stop disk 43 following downstream in the illumination beam path 10. The rotatable stop disk 43, which can also be referred to as pinhole disk, is situated in a plane 15 that is optically conjugate with respect to the sample plane 26, and is imaged via downstream optical units, which substantially correspond to the arrangement from FIG. 1 into the sample plane 26, that is to say the focal plane of the microscope objective 25.

The disk 42 with the microlens array and the stop disk 43 rotate with high rotational speed, fixed frequency and phase relationship with respect to one another and thus scan a pattern of excitation points over the sample S.

The fluorescent light 32 generated and emitted by the sample S at the excitation points illuminated in this way is imaged, once again as in the exemplary embodiment in FIG. 1, via the detection beam path 30 back to the SPAD camera D. Accordingly, the pattern of the emission points or emission spots moves over the SPAD camera D synchronously with the rotation of the disks 42, 43. The read-out pattern with which the SPAD camera D is to be controlled according to the invention is synchronized with the movement of the illumination pattern. The synchronization is effected by the PC 40, which determines, from a known instantaneous position of the disks 42, 43, the read-out pattern to be programmed into the SPAD camera D, which pattern can also be referred to as activation pattern. In this case, a trigger signal is provided to the PC 40 by way of a fast photodiode 47, which measures the transmission through one stop opening of the rotating stop disk 43 or a plurality of stop openings situated at the same distance from the axis of rotation. For this purpose, part of the illumination light 12 is coupled out via a partly transmissive mirror 44 and is directed onto the rotating stop disk 43 via a stop 46 and via the disk 42 with the arrangement of microlenses. It is furthermore also possible to couple the light from a further laser diode to the pinhole disk independently of the rest of the beam path.

The rotating stop disk 43, which realizes the manipulation device 16 in the exemplary embodiment in FIG. 2, is situated, like the DMD matrix 16 in the exemplary embodiment in FIG. 1, in a plane 15 that is optically conjugate both with respect to the sample plane 26 and with respect to the plane of the SPAD camera D. What is essential to the invention is that here, too, the manipulation device 16, that is to say the rotating stop disk 43, is arranged in the pure illumination beam path or excitation beam path of the microscope 200, that is to say in the illumination beam path 10 upstream of the main beam splitter 19. As in the example in FIG. 1, the SPAD camera D serves both as sensor and as switchable pinhole matrix, such that, as described above, confocality or oversampling of the detection point spread functions can be achieved by means of targeted activation of the pixels 36 and given suitable dimensioning of the imaging.

Instead of the rotating stop disk 43 provided with an arrangement of pinhole stops, it is also possible to use other stop geometries, such as slots, for example, in a rotating disk.

What the arrangements in FIGS. 1 and 2 have in common is that, unlike in the prior art, the fluorescent light 32 radiated back from the sample S does not have to be focused back onto the detector D via a physical pinhole stop or a pinhole, such as, for example, a micromirror of the DMD matrix 16 or a real pinhole on the rotating disk. Instead, according to the invention, the fluorescent light 32 radiated back from the sample S is imaged directly onto the SPAD camera D and, in a defined temporal relationship with the illumination pattern 18, read-out patterns of the SPAD camera D are activated according to the respective instantaneous illumination pattern 18. In principle, an electronically programmable, dynamic pinhole matrix is thus obtained which enables confocality of the data acquisition, in principle, if the imaging scale onto the SPAD camera D is dimensioned suitably or a zoom setting is chosen suitably.

If the imaging scale onto the SPAD camera D is chosen such that a detection point spread function covers a plurality of pixels 36 of the SPAD camera, an oversampling evaluation of the signal data is possible, such that confocal limiting resolution is achieved despite pinholes of finite extent. In this case, the measurement data of the SPAD camera can be computed according to the so-called image scanning.

Owing to the intrinsically high repetition rate of the SPAD camera D, a significant increase in the frame rate for this functionality is possible here in comparison with the prior art. Furthermore, likewise in contrast to the prior art, the illumination does not have to be operated stroboscopically, rather the frame rate per se can be increased. That initially results in very small numbers of photos per pixel in the individual image. However, the individual images can then be integrated taking account of the respective rotation phase of the rotating stop disk 43. What is essential to the present invention here is that the integration of the signal data is not carried out on the sensor chip as in the case of CCD and CMOS arrays, but rather in a buffer memory disposed downstream of the SPAD camera D. In general, this is a digital integration of the measured photon counting events.

The potentially very short dead times (10 ns-100 ns) of a SPAD camera enable ultrashort integration times. The SPAD pixels 36 can thus be operated in the Geiger mode, in which individual photons are counted.

In comparison with the very short read-out time of the SPAD camera D, the movement of the disks in FIG. 2 or the switchover between different illumination patterns 18 in the arrangement according to FIG. 1 is a quasi-static process. Accordingly, the FLIM signal of the dyes can be detected with the use of a laser that is pulsed in the picoseconds range.

Slower processes can likewise be measured using microscopes 100 and 200 from FIGS. 1 and 2. If such processes proceed for example on a time scale comparable with the exposure time of individual regions, that is to say rather in the milliseconds range, like phosphorescence processes, for example, the read-out pattern on the detector D can also be activated in a time-delayed manner in relation to the illumination pattern and the detector D can be correspondingly read in a time-delayed manner. In this case as it were the persistence of the sample S is measured and statements concerning the time profile of the relevant processes can also be obtained from the measured delays.

A third exemplary embodiment of a microscope according to the invention is explained with reference to FIG. 3. The microscope 300 according to the invention as shown therein has large similarities with the microscope 100 from FIG. 1. In particular, the set-up of the microscope 300 in the region of the illumination beam path 10 upstream of the main beam splitter 19 is identical to that in the microscope 100 from FIG. 1, that is to say that in FIG. 3, too, a DMD matrix 16 is used which is arranged in a plane 15 that is optically conjugate with respect to the intermediate image plane 29 and with respect to the sample plane 26.

Figure 3:
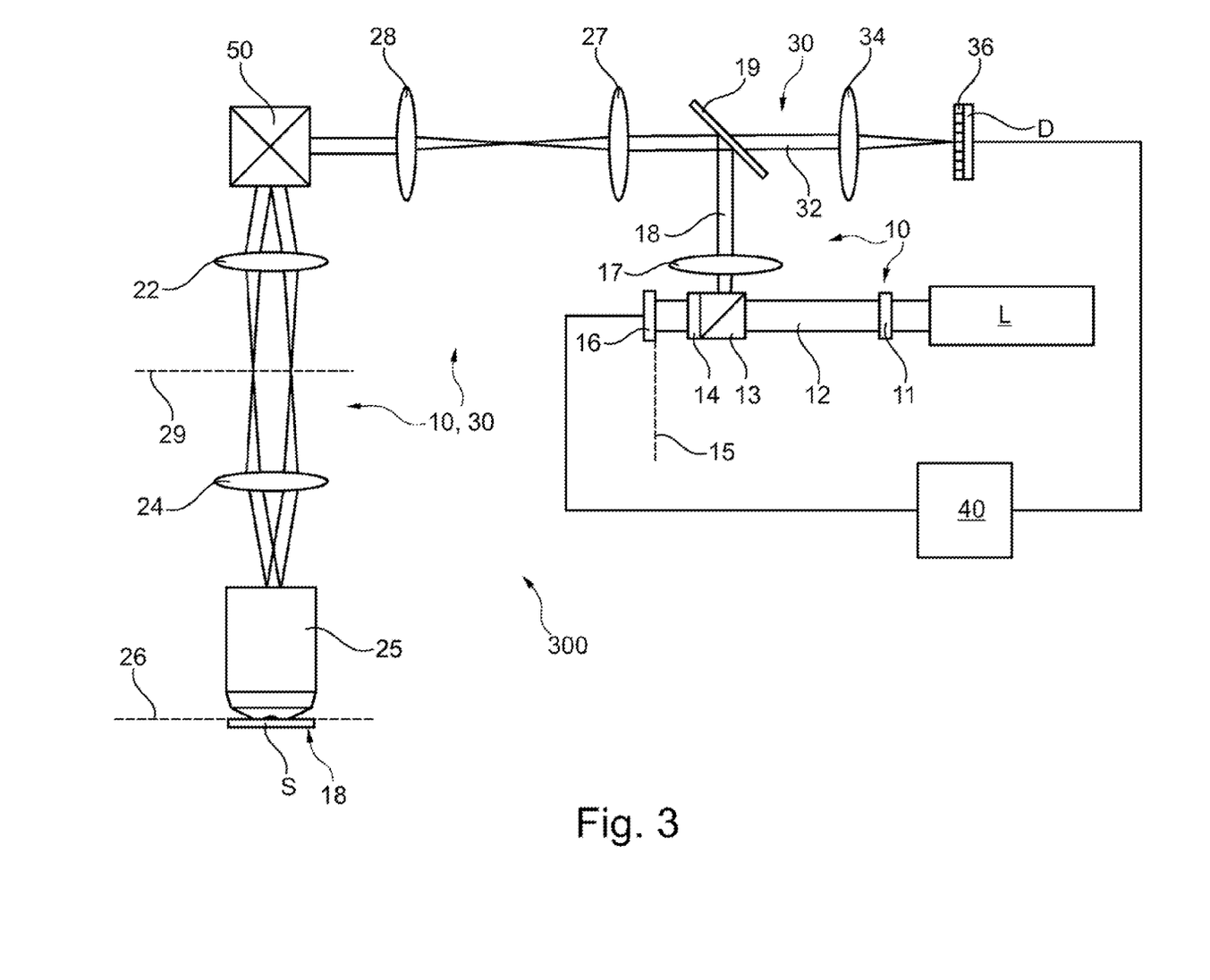
FIG. 3: shows a third exemplary embodiment of a microscope according to the invention.

The essential difference in the microscope 300 from FIG. 3 in comparison with the microscope 100 from FIG. 1 is that in FIG. 3 a scanning unit 50 is now arranged at the position of the deflection mirror 21 in FIG. 1, and that the zoom optical unit 20 present in FIG. 1 is replaced by a relay system comprising a lens 27 and a lens 28. The scanning unit 50 can comprise in particular scanning mirrors, for example galvanometric scanning mirrors. Consequently, in the exemplary embodiment from FIG. 3, the illumination pattern 18 passes via the main beam splitter 19, the lenses 27, 28, the scanning unit 50, the lenses 22, 24 and the microscope objective 25 onto the sample S.

As in FIGS. 1 and 2, fluorescent light 32 emitted by the sample S is collected and collimated by the microscope objective 25. Afterward, the fluorescent light 32 is deflected by the scanning unit 50 onto the descanned beam path, is transmitted at the main beam splitter 19 and is imaged onto the SPAD camera D.

The scanning unit 50, which is likewise controlled by the control and evaluation unit 40, is used for positioning the image of the DMD matrix 16 in the sample plane 26. This displacement of the illumination field is also referred to as panning. In order that the entire optical system of the microscope 300 does not become too complex and elaborate, the field size capable of being transmitted in the descanned beam path is limited, for example to a field diagonal of 2 mm. The descanned beam path is that part of the detection beam path 30 downstream of the scanning unit 50.

With such dimensionings, it is possible to achieve pinhole sizes of 0.2 AU, corresponding to five-fold oversampling of the Airy disk, with full illumination of the DMD matrix 16.

Since the size of the individual micromirrors of the DMD matrix 16 is below the optical resolution limit, artefacts caused by the structuring of the DMD matrix 16, which are also referred to as pattern artefacts, are already significantly reduced. Such artefacts can be reduced even further, namely blurred, if the scanning unit is actuated slightly. This is explained in greater detail below in association with FIG. 4.

As in FIG. 1, according to the invention, the illumination pattern 18 of the DMD matrix 16 and the read-out pattern of the SPAD camera D are coordinated with one another and are switched over in particular synchronously. The synchronization is effected once again by the control and evaluation unit 40.

As in the exemplary embodiment from FIG. 1, the fluorescent light 32 is detected by the SPAD camera D arranged in a dedicated detection path. The SPAD camera D is distinguished by high image refresh rates, such that it can be operated in the Geiger mode for counting individual photons. Preferably, only the pixels 36 of the SPAD camera D that are necessary for detection are activated, that is to say biased. As a result, the volume of data can be minimized and the signal-to-noise ratio (SNR) can be improved. The pixels 36 of the SPAD camera D are preferably activated according to the illumination pattern 18 generated by the DMD matrix 16. Light that impinges on the SPAD camera D outside the activated pixels 36 is therefore not registered. The SPAD camera D therefore acts like a combination of sensor matrix and switchable pinhole matrix. A major advantage of the invention is that the fluorescent light 32 is therefore not directed via the manipulation device, that is to say not directed via the DMD matrix 16, on the way to the SPAD camera D. Intensity losses upon reflection at the DMD matrix 16 are therefore avoided.

An illumination field, also referred to as PAM subfield (PAM=Programmable Array Microscope) can be dimensioned in relation to the total addressable field of view of the microscope according to the invention for example such that the total addressable field of view is composed of 100 PAM subfields. The PAM subfield is suitably displaced and positioned by means of the scanning unit 50. The total addressable field of view, also referred to as full field, can typically have a diagonal of the order of magnitude of 20 mm in the intermediate image plane 29 between scanning unit 50 and microscope objective 25.

If the DMD matrix 16 is imaged into the intermediate image in the intermediate image plane 29 such that it can address a partial field having a diagonal of 2 mm, for example, which is then put at a desired position in the total addressable field of view by means of the scanning unit 50, 100 partial images would be necessary for scanning the total addressable field of view. If the total addressable field of view is intended to be scanned at 10 fps (fps=frames per second), for example, an acquisition duration of 1 ms remains for each partial image. If for example 10% of each partial field is filled with activated pixels, the 10 fps can still be attained with a pixel residence duration of 100 µs without oversampling. In the case of double oversampling, that is to say in the case of 4 pixels per detection point spread function, a pixel residence duration of 25 µs is still attained. If, for comparison with a laser scanning microscope, a field of view of the same size were scanned conventionally at a double line rate of 1 kHz, a pixel residence duration of only 0.65 µs would result given a frame rate of only 3 fps. Owing to the high degree of parallelization that can be set as desired, a microscope according to the invention, which can also be referred to as a hybrid microscope, can be very gentle on the sample and nevertheless effect repetition significantly more rapidly than a conventional laser scanning microscope.

In addition, a measurement adapted to the sample can be effected in such a way that regions whose SNR is already high enough are not measured further and loaded with light. Firstly, stipulations on the part of the user, and also suitable algorithms, can be used for this purpose.

Advantageously, the pattern artefacts which are typical of a PAM microscope and originate from the imaging of the DMD matrix into the sample plane and the plane of the detector can be virtually eliminated in the microscope according to the invention.

Firstly, these pattern artefacts in the case of the microscope according to the invention are not as highly pronounced as in the case of PAM microscopes from the prior art, in which the DMD matrix is dimensioned to the total field of view, because the mirror substructure of the DMD matrix 16 in the case of the microscope according to the invention, that is to say the individual micromirrors, is/are preferably smaller than the diameter of a diffraction disk in the optical plane of the DMD matrix 16.

Figure 4:
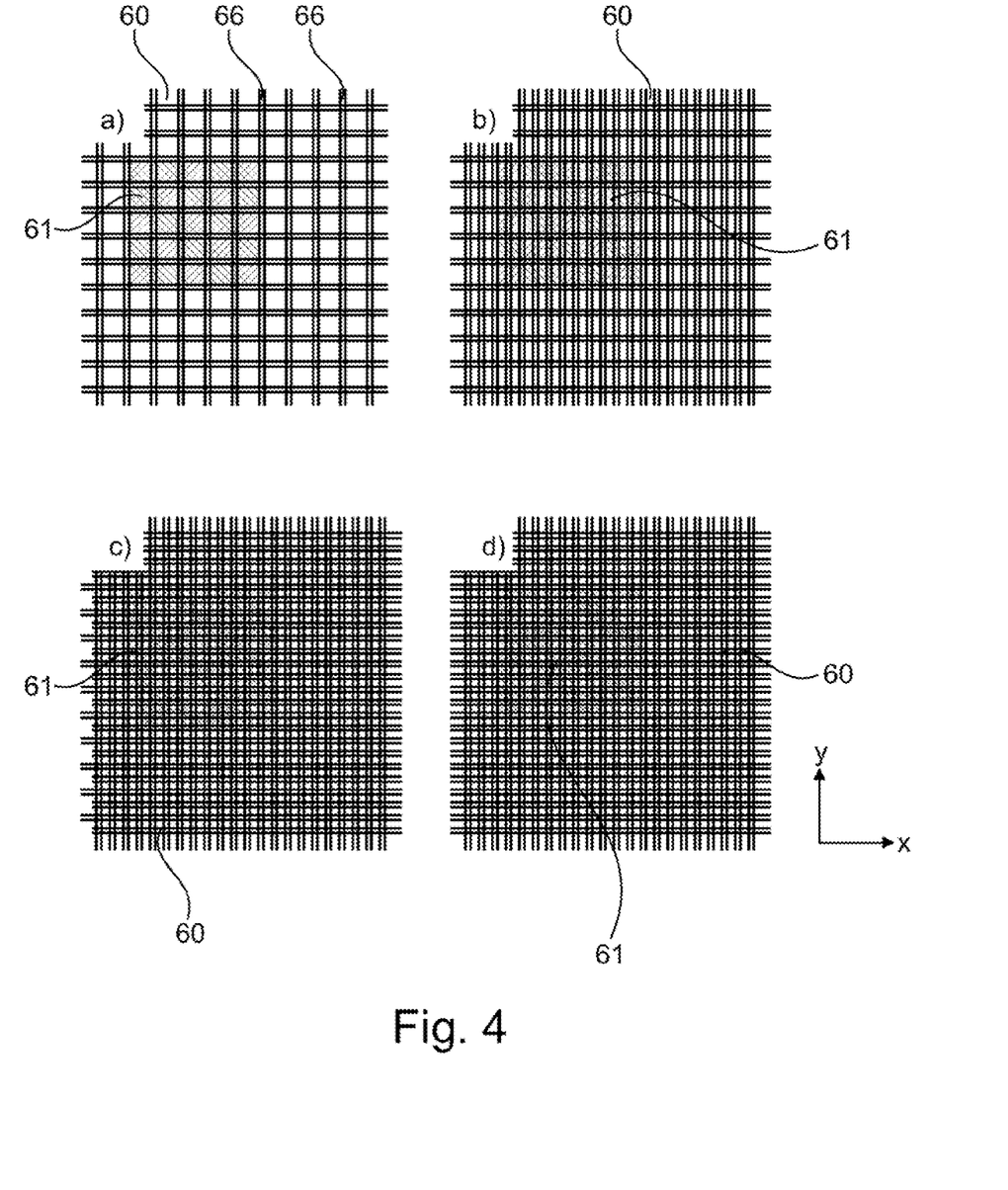
FIG. 4: shows schematic views of the detector area for elucidating one variant of the method according to the invention.

If the pattern artefacts are nevertheless clearly visible, they can be virtually completely eliminated by actuation of the scanning unit 50, that is to say in particular by movements of the scanning mirrors, during the integration time of the detector D. That is explained in more specific detail in association with FIG. 4. The line grid 60 in FIG. 4 here corresponds to the DMD matrix 16, wherein the narrow strips 66 represent the interspaces between the individual mirrors of the DMD matrix 16. Said interspaces are the actual cause of the pattern artefacts. The square 61 marks activated partial mirrors and has an edge length corresponding approximately to the diameter of a diffraction disk. In subfigures b) to d), the imaging of the DMD array 16 into the sample plane 26 was displaced by means of the scanning unit 50 by in each case $\frac{1}{10}$ of the diameter of the Airy disk in the x-direction (FIG. 4*b*) and/or y-direction (FIGS. 4*c*, 4*d*). Averaging over the images recorded with spot patterns displaced relative to one another is then effected. As a consequence, the excitation point spread function is widened only to an insignificant extent and the substructure that leads to the pattern artefacts is distinctly reduced over the majority of the area of the diffraction disk.

Just like the individual micromirrors of the DMD matrix 16 can be activated in a targeted manner, the individual pixels 36 of the SPAD camera D can also be activated. In this case, it is possible, firstly, to define the size of a confocal pinhole through the choice of a number of contiguous pixels 36 of the SPAD camera D. The signal of the relevant excitation spot integrated over the activated pixels 36 then corresponds to the intensity value in a confocal detection mode. In this context, the activated pixels 36 over which the signal is integrated are also referred to as an electronic pinhole.

Figure 5:
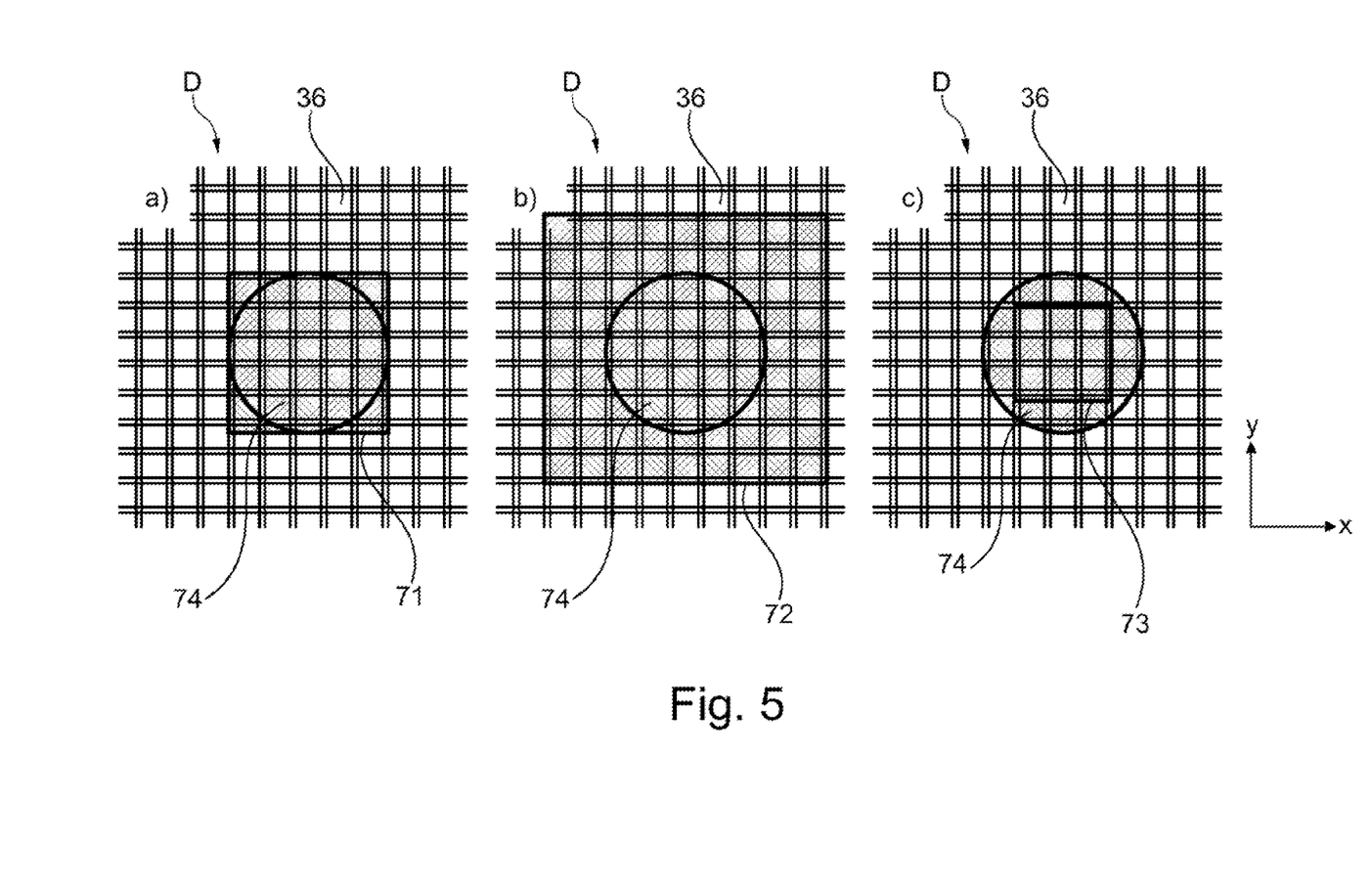
FIG. 5: shows schematic views of the detector area for elucidating a further variant of the method according to the invention.

FIG. 5 shows various sizes of an electronic pinhole in relation to the size of the detection point spread function in the plane of the SPAD camera D. In all 3 subfigures of FIG. 5, the detection point spread function is illustrated by a circular disk 74. In FIG. 5a, the pixels 36 enclosed by the square 71 are activated. That means that in this case the diameter of the pinhole corresponds to 1 AU, that is to say is equal in magnitude to the extent of the detection point spread function 74. In the case of the situation in FIG. 5b, the linear extent of the electronic pinhole defined by the square 72 is approximately double the magnitude of the detection point spread function 74. The electronic pinhole 72 is therefore larger than 1 AU. That means that confocal resolution is no longer achieved in this situation. However, the background light from other planes than the focal plane can nevertheless be effectively suppressed. In FIG. 5c, finally, the electronic pinhole defined by the square 73 is smaller than 1 AU.

On account of the pixelation and the high frame rate of the SPAD camera D, it is also possible to evaluate substructures of the detection point spread functions and, by means of deconvolution or shifting of the signal back to the center position of the point spread function, to attain the confocal limit resolution and to increase the sensitivity.

With the PAM-LSM it is additionally possible to set totally different structurings of the illumination light than the point excitations which are typical of the LSM. For this purpose, the desired patterns are programmed on the DMD matrix. The activation of the SPAD pixels then follows analogously. By way of example, the PAM subfield can be scanned with line illumination, without complex anamorphic optical units having to be installed and aligned. Very high degrees of parallelization can thus be achieved. Moreover, structured grid illuminations enabling quasi-confocal detection modes are also possible. Furthermore, even direct SIM illumination is possible since the pixel raster of the DMD matrix is smaller than a diffraction disk.

The structures of the illumination patterns can then also be selected randomly as long as a coupling of the DMD matrix and of the detector D takes place—for example by way of a control unit.

One major application of the invention will be living cell microscopy, in which so-called time lapse recordings, that is to say time series recordings, are very often effected. Phototoxic effects are problematic particularly in that case. However, the arrangement described here is very well suited, in particular, to optimizing the exposure of later recordings in a time series in such a way that regions that do not contain any luminous structures are no longer illuminated in subsequent recordings. For this purpose, by means of suitable algorithms, the control and evaluation unit can automatically recognize regions which do not contain any information, but rather only dark noise. In subsequent recordings, only the regions with image information are illuminated, or optionally a small region around them as well. In addition, the system can also make estimations about which regions of future images are expected to contain information. For this purpose, for example, a movement effected by a sample or a part of a sample can be extrapolated. One application here might be the movement of vesicles, for example. In that case, it is then necessary to adapt the switching pattern on the DMD and the SPAD array and also the scanner speed and optionally the laser power.

Traditional methods or alternatively algorithms from the field of machine learning can find application for these calculations. It is also conceivable here for the user to help the system to learn (by means of a so-called annotation) at the beginning of such a time series. As a result, therefore, this yields not just a system that effects open-loop control, but rather a closed-loop-controlled system with self-learning feedback.

The SPAD camera can be designed in such a way that a time resolution in the picoseconds range can be achieved. This makes possible a temporally resolved recording which enables the fluorescence decay behavior or the so-called fluorescence lifetimes to be represented pictorially. This option is available for all the image recording variants described above.

By virtue of the very high recording rates in conjunction with very short exposure times, SPAD cameras also allow various methods of high-resolution microscopy to be used. In this regard, it is known, for example, that methods such as PALM and d-STORM and also SOFI based on the blinking behavior of standard fluorophores become possible with sensors of this type. Precisely an arrangement like the arrangement described above now allows these methods to be implemented in a way that is particularly gentle on the sample, since it is precisely here that locally adapted illumination is advantageous.

Besides pure imaging, however, the microscope according to the invention can also be used advantageously for methods in which imaging is combined with optical manipulation of the sample, such as are being used more and more often in optogenetics, for example. The microscope according to the invention allows the free switching of an illumination pattern and a read-out pattern.

As described above, the illumination pattern 18 and the read-out pattern can in principle be switched synchronously with one another, such that locations on a sample S which are illuminated by the illumination pattern 18 are also read out simultaneously.

If the sample S is intended to be manipulated optically, then there would be a desire not to detect the regions which during a manipulation process, for example activation of channels in channelrhodopsin with a specific wavelength in specific regions of the sample, in these regions at this time. However, there is a desire to observe the reaction of the sample to this manipulation with a time offset which as far as possible should not significantly exceed one millisecond. DMDs allow switching speeds into the kHz range. SPAD cameras can be switched even more rapidly still. Since SPAD cameras are robust, during operation in saturation, it is also still possible, instead of switching off pixels 36, even subsequently, to remove those signals which are not used for imaging, but rather result from the manipulation radiation. Besides optogenetic manipulation it is also possible, of course, for further manipulation methods, such as FRAP, to be realized.

For the described application of combined manipulation/imaging, this may be advantageous for the manipulation device 16, in particular the DMD matrix, not to be illuminated with a homogeneous laser light field, but rather for a further light-shaping unit to be disposed upstream, which pre-shapes the light on the manipulation device 16 such that regions of the manipulation device 16 which are intended to be used for manipulation are illuminated more intensely than regions used only for observation. The invention thus provides an apparatus that is particularly well suited to the application of optical manipulation/imaging of a sample.

In addition, it may be advantageous if polychromatic illumination of a sample S is effected, wherein for example an activation laser, typically very short-wave with wavelengths of less than 450 nm, is condensed to a few points in the image field by means of the upstream beam-shaping unit, while an excitation laser illuminates the manipulation device 16, in particular the DMD matrix 16, over a large area.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

10 Illumination beam path
11 Diffractive optical element
12 Illumination light
13 Polarizing beam splitter
14 Quarter-wave plate
15 Plane that is optically conjugate with respect to the sample plane
16 Controllable manipulation device
17 Collimation lens
18 Illumination pattern
19 Main beam splitter
20 Zoom optical unit
21 Deflection mirror
22 Lens
24 Tube lens
25 Microscope objective
26 Sample plane
27 Relay lens
28 Relay lens
29 Intermediate image plane
30 Detection beam path
32 Fluorescent light emitted by sample S
34 Lens
36 Pixel of the detector
40 Control and evaluation unit
42 Rotatable microlens array
43 Rotatable stop disk
44 Output coupling mirror
45 Deflection mirror
46 Stop
47 Photodiode
50 Scanning unit
60 Line grid
61 Activated partial mirrors
66 Strips corresponding to interspaces between micromirrors
71 Detection pinhole=1 AU
72 Detection pinhole larger than 1 AU
73 Detection pinhole smaller than 1 AU
100 Microscope according to the invention
200 Microscope according to the invention
300 Microscope according to the invention
D Detector
L Light source
S Sample
x, y Coordinate directions

What is claimed is:

1. A microscope comprising:
a light source for providing illumination light,
a controllable manipulation device for variably generating an illumination pattern to be selected of the illumination light,
an illumination beam path with a microscope objective for directing the illumination pattern onto a sample to be examined,
a detector having a multiplicity of pixels for detecting fluorescent light emitted by the sample,
a detection beam path for directing the fluorescent light emitted by the sample onto the detector,
a main beam splitter for splitting illumination light and fluorescent light,
a control and evaluation unit for controlling the manipulation device and for evaluating data measured by the detector,
wherein said manipulation device is arranged in the illumination beam path upstream of the main beam splitter in a vicinity of a plane that is optically conjugate with respect to a sample plane,
wherein said pixels of the detector are activatable by the control and evaluation unit individually and in read-out patterns to be selected, and
wherein said control and evaluation unit is configured for activating pixels of the detector individually or in a selected read-out pattern depending on a selected illumination pattern.

2. The microscope as claimed in claim 1, wherein said manipulation device for generating an illumination pattern to be selected comprises a multiplicity of pixels.

3. The microscope as claimed in claim 1, wherein said manipulation device comprises a digital micromirror array.

4. The microscope as claimed in claim 1, wherein said manipulation device comprises a spatial light modulator.

5. The microscope as claimed in claim 1, wherein said manipulation device for variably generating an illumination pattern comprises a rotatable stop disk.

6. The microscope as claimed in claim 5, wherein said rotatable stop disk comprises a multiplicity of pinhole stops arranged spirally in the form of Achimedes' spirals, and is a Nipkow disk.

7. The microscope as claimed in claim 5, wherein said rotatable stop disk comprises a multiplicity of slots.

8. The microscope as claimed in claim 1, further comprising a microlens array located upstream a rotatable stop disk, which microlens array focuses illumination light onto stop openings of the stop disk and rotates at a speed that is the same speed as the stop disk during operation.

9. The microscope as claimed in claim 1, wherein said control and evaluation unit is configured to synchronize a read-out pattern of the detector with an illumination pattern generated by a rotating stop disk.

10. The microscope as claimed in claim 5, further comprising a photodiode for measuring an intermittent light transmission through or an intermittent light reflection from the rotatable stop disk provided for synchronizing control of the detector with a movement of the rotatable stop disk.

11. The microscope as claimed in claim 1, wherein said detector comprises a Single Photon Avalanche Diode ("SPAD") array or a SPAD camera.

12. The microscope as claimed in claim 1, further comprising a microlens array upstream of the detector.

13. The microscope as claimed in claim 1, further comprising at least one emission filter, in the form of a changer having a plurality of emission filters, is located in the detection beam path downstream of the main color splitter.

14. The microscope as claimed in claim 1, wherein a specific group of pixels of the manipulation device is imaged onto a defined group of pixels of the detector, or
   wherein each pixel of the manipulation device is imaged onto a defined group of pixels of the detector, or
   in that a specific group of pixels of the manipulation device is imaged onto a specific pixel of the detector, or
   wherein each pixel of the manipulation device is imaged onto exactly one pixel of the detector.

15. The microscope as claimed in claim 1, wherein the control and evaluation unit is configured to synchronously control the detector with a read-out pattern corresponding to the selected illumination pattern.

16. The microscope as claimed in claim 1, wherein the control and evaluation unit is configured to control the detector with a read-out pattern in a manner temporally offset with respect to an illumination pattern radiated onto the sample.

17. The microscope as claimed in claim 1, wherein the control and evaluation unit is configured to control the manipulation device for scanning point patterns, line patterns or gridlike patterns of illumination patterns over the sample.

18. The microscope as claimed in claim 1, further comprising a zoom optical unit is located between the main beam splitter and the microscope objective or between the manipulation device and the main beam splitter and/or between the main beam splitter and the detector.

19. The microscope as claimed in claim 1, further comprising a scanning unit, having galvanometric scanner mirrors, is provided for laterally displacing an illumination field.

20. The microscope as claimed in claim 1, further comprising a polarizing beam splitter and a quarter-wave plate located in the illumination beam path upstream of the main beam splitter.

21. The microscope as claimed in claim 1, further comprising a Total Internal Reflection (TIR) prism is located in the illumination beam path.

22. The microscope as claimed in claim 1, further comprising at least one excitation filter, in the form of a changer having various excitation filters in the illumination beam path upstream of the main color splitter.

23. The microscope as claimed in claim 1, further comprising a diffractive optical element located directly downstream of the light source in the illumination beam path for homogenizing a profile of the illumination light.

24. The microscope as claimed in claim 1, further comprising a spatial light modulator (SLM), located upstream of the manipulation device, as a further light-shaping unit.

25. The microscope as claimed in claim 1, further comprising upstream of a further light-shaping unit at least one color splitter is provided for directing selected wavelengths to the further light-shaping unit.

26. The microscope as claimed in claim 1, further comprising at least one separate light source for optically manipulating the sample.

27. The microscope as claimed in claim 1, further comprising a spatial light modulator (SLM), for wavefront modulation, positioned in the illumination beam path, in a plane that is optically conjugate with respect to the back pupil of the microscope objective.

28. A method for microscopy, comprising:
   providing illumination light by a light source,
   generating an illumination pattern by a controllable manipulation device for variably generating an illumination pattern to be selected of the illumination light,
   directing the illumination pattern via an illumination beam path with a microscope objective onto a sample to be examined,
   directing fluorescent light emitted by the sample via a detection beam path onto a detector having a multiplicity of pixels and is detected by the detector,
   splitting illumination light and fluorescent light by a main beam splitter,
   arranging the manipulation device upstream of the main beam splitter in a vicinity of a plane that is optically conjugate with respect to a sample plane, and
   activating the pixels of the detector individually or in a selected read-out pattern depending on a selected illumination pattern.

29. The method as claimed in claim 28, wherein said detector is synchronously controlled with a read-out pattern corresponding to the illumination pattern generated by the manipulation device.

30. The method as claimed in claim 28, wherein the detector is controlled with a read-out pattern in a manner temporally offset with respect to an illumination pattern radiated onto the sample.

31. The method as claimed in claim 28, wherein the detector is a photon counting sensor, in in the form of a SPAD camera, the pixels of which are operated in the Geiger mode, and wherein digital counts corresponding to photon detection events are read out by the detector.

32. The method as claimed in claim 28, wherein exposure times for individual pixels of the detector are set specifically.

33. The method as claimed in claim 28, wherein exposure times for individual pixels of the detector are set depending on measurement data obtained from the sample.

34. The method as claimed in claim 28, further comprising choosing a setting of a DMD matrix, forming the zoom optical unit, for which the manipulation devices imaged onto a full field of view.

35. The method as claimed in claim 28, further comprising choosing a setting of a DMD matrix, forming the zoom optical unit, for which the manipulation device is imaged onto a full field of view.

36. The method as claimed in claim 28, further comprising choosing a setting of a DMD matrix of the zoom optical unit for which the manipulation device is imaged onto a part of a field of view.

37. The method as claimed in claim 28, further comprising displacing the illumination field laterally by a scanning unit.

38. The method as claimed in claim 28, further comprising carrying out scans with point, line or grid illumination by means of the manipulation device.

39. The method as claimed in claim 28, further comprising slightly actuating a scanning unit during an integration time of the detector.

40. The method as claimed in claim 39, further comprising moving the illumination field, between individual images to be summed, laterally by the scanning unit by a fraction of an Airy disk by 1% to 50%.

41. The method as claimed in claim 39, further comprising moving the illumination field, between individual images to be summed, in two independent coordinate directions (x, y).

42. The method as claimed in claim 28, further comprising carrying out temporally resolved measurements after an optical excitation or manipulation of the sample.

43. The method as claimed in claim 28, further comprising operating a laser in a pulsed manner.

44. The method as claimed in claim 28, further comprising extrapolating a movement carried out by a component of a biological, sample.

45. The method as claimed in claim 28, further comprising carrying out Structured Illumination Microscopy (SIM) illumination of the sample.

46. The method as claimed in claim 28, further comprising illuminating the sample polychromatically.

47. The method as claimed in claim 28, further comprising carrying out Photoactivated Localization Microscopy (PALM), Direct Stochastic Optical Reconstruction Microscopy (d-STORM), Super-resolution Optical Fluctuation Imaging (SOFI) or Fluorescence Recovery After Photobleaching (FRAP) methods.

48. The method as claimed in claim 28, wherein regions of a sample are no longer impinged on by illumination light as soon as a specific value for a signal-to-noise ratio has been reached in these regions in a recorded image.

49. The method as claimed in claim 28, further comprising determining fluorescence lifetimes of emissive dyes by evaluating detection times of individual photons.

50. The method as claimed in claim 34, wherein a detection point spread function on the detector illuminates more than five pixels.

51. The method as claimed in claim 39, further comprising moving the illumination field, between individual images to be summed, laterally by the scanning unit by a fraction of an Airy disk by 3% to 30%.

52. The method as claimed in claim 39, further comprising moving the illumination field, between individual images to be summed, laterally by the scanning unit by a fraction of an Airy disk by 5% to 15%.

* * * * *